US010600238B2

(12) United States Patent
Tan et al.

(10) Patent No.: US 10,600,238 B2
(45) Date of Patent: Mar. 24, 2020

(54) IMAGE TAMPERING FORENSICS METHOD AND APPARATUS

(71) Applicant: INSTITUTE OF AUTOMATION, CHINESE ACADEMY OF SCIENCES, Beijing (CN)

(72) Inventors: Tieniu Tan, Beijing (CN); Jing Dong, Beijing (CN); Wei Wang, Beijing (CN); Bo Peng, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/336,918

(22) PCT Filed: Mar. 9, 2017

(86) PCT No.: PCT/CN2017/076106
§ 371 (c)(1),
(2) Date: Mar. 27, 2019

(87) PCT Pub. No.: WO2018/161298
PCT Pub. Date: Sep. 13, 2018

(65) Prior Publication Data
US 2019/0228564 A1 Jul. 25, 2019

(51) Int. Cl.
*H04L 29/06* (2006.01)
*G06K 9/00* (2006.01)
(Continued)

(52) U.S. Cl.
CPC ........ *G06T 15/205* (2013.01); *G06K 9/00201* (2013.01); *G06K 9/00362* (2013.01);
(Continued)

(58) Field of Classification Search
USPC ....... 382/100, 103, 106, 154, 168, 173, 181, 382/191, 199, 209, 219, 224, 220, 254,
(Continued)

(56) References Cited

U.S. PATENT DOCUMENTS 9,031,329 B1 *  5/2015  Farid .................. G06K 9/00577
                                                      382/209
2007/0038861 A1 *  2/2007  Weber .................. G06T 1/0021
                                                      713/176

(Continued)

OTHER PUBLICATIONS

Yun Li, Copy-Paste Image Forensic Algorithm Study Based on SIFT, China Master's Theses Full-text Database (CMFD), IT series, Jan. 15, 2016, No. 01.

*Primary Examiner* — Seyed H Azarian
(74) *Attorney, Agent, or Firm* — Bayramoglu Law Offices LLC

(57) ABSTRACT

An image tampering forensics method includes labeling an observation clue of a to-be-detected image, constructing a three-dimensional morphable model of an object of a category to which the target object belongs, estimating a three-dimensional normal vector to the supporting plane according to the observation clue, estimating a three-dimensional attitude of the target object according to the observation clue and the three-dimensional morphable model to obtain a plane normal vector to a plane where a side of target object in contact with the supporting plane is located, computing a parallelism between the target object and the supporting plane, and/or among a plurality of target objects, and judging whether the to-be-detected image is a tampered image or not according to the parallelism.

17 Claims, 5 Drawing Sheets

(51) Int. Cl.
*G06T 15/20* (2011.01)
*G06T 7/00* (2017.01)

(52) U.S. Cl.
CPC ............ *G06K 9/00671* (2013.01); *G06T 7/00* (2013.01); *G06T 2201/0201* (2013.01); *G06T 2215/16* (2013.01)

(58) Field of Classification Search
USPC ....... 382/274, 276, 285–291, 294, 305, 312, 382/218; 726/23; 713/176, 161
See application file for complete search history.

(56) References Cited

U.S. PATENT DOCUMENTS

| | | | |
|---|---|---|---|
| 2014/0380477 A1* | 12/2014 | Li | H04L 63/1466 726/23 |
| 2015/0213324 A1* | 7/2015 | Farid | G06K 9/00577 382/218 |
| 2017/0091588 A1* | 3/2017 | Liu | G06K 9/00899 |

* cited by examiner

IMAGE TAMPERING FORENSICS METHOD AND APPARATUS

CROSS REFERENCE TO RELATED APPLICATIONS

This application is the national phase entry of International Application PCT/CN2017/076106, filed on Mar. 9, 2017, the entire contents of which are incorporated herein by reference.

TECHNICAL FIELD

The present invention relates to the field of computer vision and image recognition technology, particularly to an image tampering forensics method and an apparatus thereof.

BACKGROUND

As a technology to verify authenticity and source of images without relying on any signature pre-extraction or pre-embedded information, blind digital image forensics technology is gradually becoming a new research hotspot in the field of multimedia security and has broad application prospects. At present, blind digital image forensics technology includes multiple kinds of forensics methods according to different forensics clues, such as copy-move, multiple JPEG compression, high-frequency statistical feature of image, lighting inconsistency, and geometry inconsistency, etc. The forensics methods based on inconsistency clues in scenes utilize computer vision methods to estimate variants in the scenes, and these methods are suitable for tampering forensics of low quality images and can achieve good post-processing robustness.

However, in general the forensics methods based on inconsistency clues in scenes is only applicable to image tampering forensics based on a certain scene. Thus, the accuracy of detection results may be limited. For example, literature entitled "*Image splicing detection based on general perspective constraints*" authored by Iuliani, Massimo, Giovanni Fabbri, and Alessandro Piva, and disclosed on Information Forensics and Security (WIFS), 2015 IEEE International Workshop on. IEEE, 2015 discloses an image tampering forensics method based on height ratio of objects in scenes. Literature entitled "Optimized 3D Lighting Environment Estimation for Image Forgery Detection", authored by Peng, Bo, et al., and disclosed on IEEE Transactions on Information Forensics and Security 12.2 (2017): 479-494 discloses an image tampering forensics method based on lighting direction inconsistencies. Literature entitled "A 3-D photo forensic analysis of the Lee Harvey Oswald backyard photo", authored by Farid, Hany, and disclosed on Hanover, N.H. (2010) discloses an image tampering forensics method based on human assisted 3D scene reconstruction analysis.

To this end, the present invention provides an image tampering forensics method based on new forensics clues in scenes to improve detection accuracy of the forensics method based on inconsistent clues in scenes.

SUMMARY

In order to meet the needs of prior art, the present invention provides an image tampering forensics method based on plane contact constraints. The forensics method is not only applicable to tampering detection of low quality image, but also can improve the detection accuracy of the forensics method based on inconsistency clues in scenes. Meanwhile, the present invention also provides an image tampering forensics apparatus.

In a first aspect, a technical solution of the image tampering forensics method according to the present invention is as follows.

The method includes:

labeling an observation clue of a to-be-detected image, wherein the to-be-detected image includes a target object and a supporting plane, the target object and the supporting plane have a plane contact relationship;

constructing a three-dimensional morphable model of an object of a category to which the target object belongs;

estimating a three-dimensional normal vector to the supporting plane according to the observation clue;

estimating a three-dimensional attitude of the target object according to the observation clue and the three-dimensional morphable model to obtain a plane normal vector to a plane where a side of the target object in contact with the supporting plane is located; and computing a parallelism between the target object and the supporting plane, and/or a parallelism among a plurality of the target objects according to the three-dimensional normal vector and the plane normal vector, and judging whether the to-be-detected image is a tampered image according to the parallelism, wherein the parallelism is an included angle of normal vectors of different planes.

Further, a preferred technical solution provided by the present invention is that labeling the observation clue of the to-be-detected image specifically includes:

labeling characteristic observation points of the target object in the to-be-detected image, and labeling endpoints of straight-line segments in two different directions in the to-be-detected image, wherein the straight-line segments are parallel to the supporting plane;

wherein the characteristic observation points include contour points of the target object; the straight-line segments of different directions include a plurality of parallel straight-line segments.

Further, a preferred technical solution provided by the present invention is that:

labeling contour points of the target object specifically includes labeling the contour points of the target object by a method of moving an interactive mouse; and labeling the endpoints of the straight-line segments specifically includes:

labeling a center point for each of the two endpoints of each straight-line segment by clicking and selecting through the interactive mouse; and configuring a measurement uncertainty of the center point according to an ambiguity degree of edge points of each straight-line segment, and labeling a dispersion region of the center point according to the measurement uncertainty.

Further, a preferred technical solution provided by the present invention is that constructing the three-dimensional morphable model of the object of the category to which the target object belongs specifically includes:

acquiring 3D sample models of a plurality of samples of objects categorized to the category to which the target object belongs, and implementing a semantic correspondence to each vertex of each 3D sample model; and constructing the three-dimensional morphable model by a principal component analysis method according to the 3D sample models subjected to the semantic correspondence.

Further, a preferred technical solution provided by the present invention is that:

acquiring 3D sample models of a plurality of samples of objects categorized to the category to which the target object belongs specifically includes acquiring predetermined 3D sample models in a graphics software, and/or acquiring the 3D sample models of the samples by a 3D model scanning device.

Further, a preferred technical solution provided by the present invention is that:

implementing the semantic correspondence to each vertex of each 3D sample model specifically includes implementing the semantic correspondence to the 3D sample models by a non-rigid registration method.

Further, a preferred technical solution provided by the present invention is that constructing the three-dimensional morphable model specifically includes:

constructing one-dimensional column vectors according to three-dimensional coordinates of the 3D sample models subjected to the semantic correspondence, wherein each one-dimensional column vector corresponds to one 3D sample model, and elements of each one-dimensional column vector are three-dimensional coordinates of vertices of each 3D sample model;

splicing the one-dimensional column vectors of all 3D sample models by column to obtain a 3D sample model matrix; and analyzing the 3D sample model matrix by a principal component analysis method to obtain the three-dimensional morphable model of the object of the category to which the target object belongs.

Further, a preferred technical solution provided by the present invention is that: estimating the three-dimensional normal vector to the supporting plane according to the observation clue specifically includes:

sampling the endpoints of the straight-line segments parallel to the supporting plane of two different directions labeled in the to-be-detected image, and computing vanishing points of the two directions in the to-be-detected image according to sampled endpoints;

constructing an equation of a vanishing line of the supporting plane according to three-dimensional homogeneous coordinates of the vanishing points, wherein the vanishing line of the supporting plane is a straight line located on a connecting line of the vanishing points; and computing the three-dimensional normal vector to the supporting plane according to the equation of the vanishing line and camera intrinsic parameters;

wherein the endpoints are sampled for multiple times to obtain multiple sets of three-dimensional normal vectors.

Further, a preferred technical solution provided by the present invention is that, sampling the endpoints of the straight-line segments specifically includes:

configuring a two-dimensional coordinate of the center point of each of the two endpoints as an average value, configuring the measurement uncertainty of each center point to be a standard deviation, and sampling the endpoints of the straight-line segments by a Gaussian distribution sampling method.

Further, a preferred technical solution provided by the present invention is that:

computing the vanishing points of each direction in the to-be-detected image specifically includes computing the vanishing points of each direction by a maximum likelihood estimation method; and constructing the equation of the vanishing line of the supporting plane specifically includes constructing the equation of the vanishing line by a formula for computing a straight-line equation given two points.

Further, a preferred technical solution provided by the present invention is that a formula for calculating the three-dimensional normal vector is as follows:

$$n = K^T l,$$

where n is the three-dimensional normal vector to the supporting plane in a camera coordinate system; K is a matrix of the camera intrinsic parameters; T is a notation of matrix transpose; and l is the equation of the vanishing line.

Further, a preferred technical solution provided by the present invention is that estimating the three-dimensional attitude of the target object according to the observation clue and the three-dimensional morphable model specifically includes:

constructing a target function for fitting the three-dimensional morphable model according to the characteristic observation points of the target object in the to-be-detected image and the three-dimensional morphable model, and implementing an optimization computation on the target function to obtain optimized three-dimensional attitude parameters and three dimensional shape parameters of the target object;

wherein multiple times of parameter initialization are implemented on the target function to obtain multiple sets of optimized three-dimensional attitude parameters and three-dimensional shape parameters.

Further, a preferred technical solution provided by the present invention is that a formula for computing the target function is as follows:

$$\operatorname*{argmin}_{\theta_p, \theta_s} \sum_{n=1}^{N} \min_m \|c_n - \hat{c}_m(\theta_p, \theta_s; \theta_c)\|^2,$$

where N and n refer to a total number and a sequence number of the characteristic observation points of the target object in the to-be-detected image, respectively; $c_n$ is the $n_{th}$ characteristic observation point of the target object; $\hat{c}_m$ is the $m_{th}$ characteristic observation point of a two-dimensional projection of the three-dimensional morphable model; $\|c_n - \hat{c}_m(\theta_p, \theta_s; \theta_c)\|^2$ is a square of an Euclidean distance between the characteristic observation point $c_n$ and the characteristic observation point $\hat{c}_m$; $\theta_p$ and $\theta_s$ refer to a three-dimensional attitude parameter and a three-dimensional shape parameter of the target object, respectively; and $\theta_c$ is a camera intrinsic parameter;

a constraint condition of the target function is as follows:

$$|(\theta_s)_n| \leq k\sigma_n,$$

where $(\theta_s)_n$ is the $n_{th}$ component of the three-dimensional shape parameter of the target object; $\sigma_n$ is a standard deviation in a direction of a $n_{th}$ principal component when the three-dimensional morphable model is constructed by using a principal component analysis method; and k is a predetermined constant.

Further, a preferred technical solution provided by the present invention is that the optimization computation of the target function includes optimizing the target function by an iterative closest point algorithm, specifically includes:

acquiring the characteristic observation points of a two-dimensional projection of the three-dimensional morphable model closest to the characteristic observation points of the target object in the to-be-detected image; then correcting a corresponding relationship between the three-dimensional morphable model and the two-dimensional projection thereof according to a corresponding relationship between each characteristic observation point of the target object in the to-be-detected image and a corresponding closest point; and implementing a parameter optimization to a corrected three-dimensional morphable model, and re-correcting a corresponding relationship between a three-dimensional morphable model subjected to the parameter optimization and a two-dimensional projection thereof until a residual of the target function satisfies a convergence condition or reaches a predetermined number of iterations, wherein the parameter includes three-dimensional attitude parameters and the three-dimensional shape parameters.

Further, a preferred technical solution provided by the present invention is that implementing multiple times of parameter initialization to the target function specifically includes:

randomly selecting a plurality of parameters in a parameter dispersion region centered at a predetermined parameter value, and using each of the plurality of parameters as a parameter initial value for a respective optimization computation of the target function, respectively.

Further, a preferred technical solution provided by the present invention is that the method includes computing the parallelism between the target object and the supporting plane, and/or the parallelism among a plurality of the target objects according to the following formula, specifically the formula is presented below:

$$D_{avr}(\mathcal{P}, \mathcal{Q}) = \text{Ang}(p_0, q_0),$$

where $\mathcal{P}$ is a distribution set of the plane normal vectors of the target object; $\mathcal{Q}$ is a distribution set of the three-dimensional normal vectors to the supporting plane or a distribution set of the plane normal vectors of another target object; $D_{avr}(\mathcal{P}, \mathcal{Q})$ is an included angle between average directions of the distribution set $\mathcal{P}$ and the distribution set $\mathcal{Q}$; $p_0$ is a weighted average value of the distribution set $\mathcal{P}$; $q_0$ is a weighted average value of the distribution set $\mathcal{Q}$; and Ang is a function for computing the included angle;

a computation formula of a weighted average value $g_0$ of any distribution set $\mathcal{G}$ is as follows:

$$g_0 = \frac{\sum_{a=1}^{A} \frac{1}{e_a^2} g_a}{\sum_{a=1}^{A} \frac{1}{e_a^2}},$$

where the distribution set $\mathcal{G}$ is the distribution set of the plane normal vector of the target object or the distribution set of the three-dimensional normal vectors to the supporting plane; $g_a$ is the $a_{th}$ normal vector in the distribution set $\mathcal{G}$; and A is a total number of normal vectors in the distribution set $\mathcal{G}$; and $e_a$ is a residual of the $a_{th}$ normal vector $g_a$: when the distribution set $\mathcal{G}$ is the distribution set of the plane normal vector of the target object, a value of the residual $e_a$ is a residual satisfied the convergence condition and obtained by implementing the optimization computation to the target function for constructing the three-dimensional morphable model; when the distribution set $\mathcal{G}$ is the distribution set of the three-dimensional normal vectors to the supporting plane, the value of the residual $e_a$ is a fixed constant.

Further, a preferred technical solution provided by the present invention is that the method further includes computing a parallelism threshold and a probability of tampering for judging whether the to-be-detected image is a tampered image according to parallelism probability density distributions of a real target object and a tampered target object in the to-be-detected image, specifically:

a computation formula of the probability of tampering is as follows:

$$P(y=1 \mid D) = \frac{f(D \mid y=1)P(y=1)}{f(D \mid y=1)P(y=1) + f(D \mid y=0)P(y=0)}$$

where y=1 represents that the to-be-detected image is a tampered image; y=0 represents that the to-be-detected image is a real image; D is the parallelism between the target object and the supporting plane in the to-be-detected image; P(y=1|D) represents a probability that the to-be-detected image is tampered when the parallelism of the target object is D; $f$(D|y=1) represents a probability density of the parallelism D when the to-be-detected image is a tampered image; $f$(D|y=0) represents a probability density of the parallelism D when the to-be-detected image is the real image; and priori probabilities are similar when the to-be-detected image is a tampered image and when the to-be-detected image is the real image;

the parallelism threshold is a corresponding parallelism $D_{50\%}$ when the probability of tampering is 50%.

In a second aspect, a technical solution of the image tampering forensics apparatus in the present invention is that, the apparatus includes:

an observation clue labeling module, configured to label an observation clue of a to-be-detected image, wherein the to-be-detected image includes a target object and a supporting plane, and the target object and the supporting plane have a plane contact relationship;

a three-dimensional morphable model constructing module, configured to construct a three-dimensional morphable model of an object of a category to which the target object belongs;

a supporting plane normal vector estimating module, configured to estimate a three-dimensional normal vector to the supporting plane according to the observation clue;

a target object normal vector estimating module, configured to estimate a three-dimensional attitude of the target object according to the observation clue and the three-dimensional morphable model to obtain a plane normal vector to a plane where a side of the target object in contact with the supporting plane is located; and a judging module, configured to compute a parallelism between the target object and the supporting plane, and/or among a plurality of the target objects according to the three-dimensional normal vector and the plane normal vector, and judging whether the to-be-detected image is a tampered image, according to the parallelism, wherein the parallelism is an included angle of normal vectors of different planes.

Compared with the prior art, the technical solutions mentioned above at least have following advantages.

1. With the image tampering forensics method provided by the present invention, whether a to-be-detected image is a tampered image can be judged by detecting the parallelism between the target object and the supporting plane which have a plane contact relationship in the to-be-detected image and according to the magnitude of the parallelism. The method does not depend on tiny statistical features in the to-be-detected image, and can effectively judge whether a low quality image is a tampered image.

2. With the image tampering forensics apparatus provided by the present invention, the supporting plane normal vector estimating module can estimate the three-dimensional normal vector to the supporting plane, the target object normal vector estimating module can estimate the plane normal vector of the target object, the judging module can compute the parallelism between the target object and the supporting plane, and/or among a plurality of the target objects according to the three-dimensional normal vector and the plane normal vector mentioned above, and effectively judge whether the low quality image is a tampered image according to the parallelism.

11: observation clue labeling module; 12: three-dimensional morphable model constructing module; 13: supporting plane normal vector estimating module; 14: target object normal vector estimating module; 15: judging module; 211: three-dimensional attitude of a left shoe of a pair of shoes ID1; 221: three-dimensional attitude of a right shoe of the pair of shoes ID1; 231: three-dimensional attitude of a left shoe of a pair of shoes ID2; 232: initial three-dimensional attitude of a left shoe of the pair of shoes ID2; 233: intermediate three-dimensional attitude of a left shoe of the pair of shoes ID2; 234: final three-dimensional attitude of a left shoe of the pair of shoes ID2; 241: three-dimensional attitude of a right shoe of the pair of shoes ID2; 242: initial three-dimensional attitude of a right shoe of the pair of shoes ID2; 243: intermediate three-dimensional attitude of a right shoe of the pair of shoes ID2; 244: final three-dimensional attitude of a right shoe of the pair of shoes ID2; 41: 3D sample model of leather shoes; 42: 3D sample model of leather shoes subjected to semantic correspondence; 51: a 3D sample model of casual shoes; 52: a 3D sample model of casual shoes subjected to semantic correspondence; 61: a 3D sample model of sneakers; 62: a 3D sample model of sneakers subjected to semantic correspondence; 71: a distribution of plane normal vectors of the pair of shoes ID 1; 72: a distribution of plane normal vectors of the pair of shoes ID2; 73: a three-dimensional normal vector distribution of the ground.

DETAILED DESCRIPTION OF THE EMBODIMENTS

Preferred embodiments of the present invention will be described in accordance with the drawings, hereinafter. Those skilled in the art should be able to understand that these preferred embodiments are merely used for explaining technical principles of the present invention rather than limit the scope of the present invention.

Figure 2:
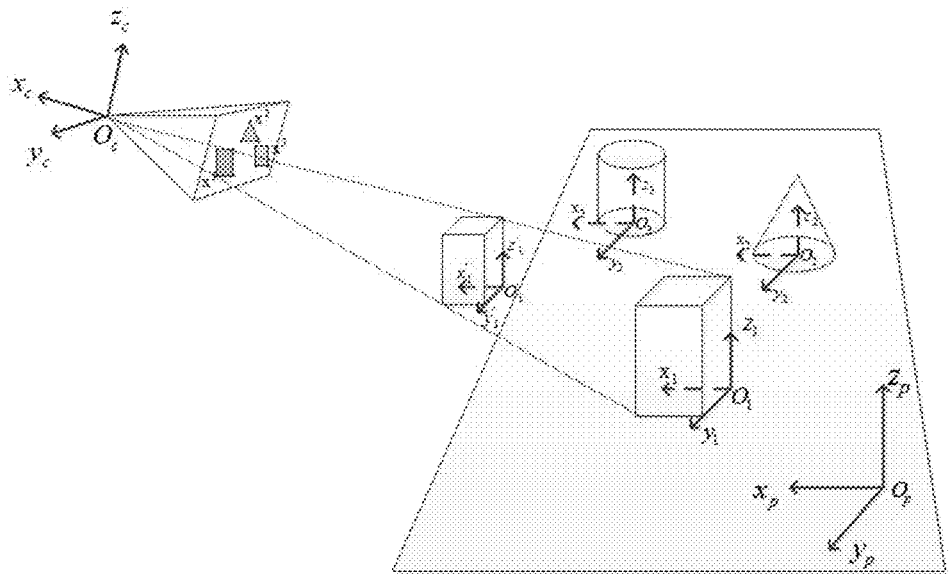
FIG. 2 is a diagram illustrating a contact relationship between a target object and a supporting plane according to an embodiment of the present invention.

A plane contact relationship means that there is a contact plane between an object and a component supporting the object. For example, a person standing on the ground, i.e. there is a plane contact relationship between the ground and the shoe sole of the person; a car on a road, i.e. there is a plane contact relationship between the road surface and the tire bottom surface of the car, a bottle on a desk, i.e. there is a plane contact relationship between the desk surface and the bottom surface of the bottle. Due to the plane contact relationship between the target object and the supporting plane, a coordinate system of the target object should be parallel to a coordinate system of the supporting plane, and coordinate systems of different target objects that have an identical plane contact relationship with the supporting plane should also be parallel to each other. FIG. 2 exemplarily shows the contact relationship between the target object and the supporting plane. As shown in the drawing, $O_1 z_1$ is parallel to $O_p z_p$, and is also parallel to $O_2 z_2$. When the image is a tampered image, for example, the to-be-detected image is an image formed by splicing on a software of PS, the spliced object is difficult to have a real plane contact relationship with the supporting plane in a three-dimensional scene, i.e. the image splicing may destroy the plane contact constraints of the to-be-detected image. With an image tampering forensics method provided by the present invention, whether the to-be-detected image is a tampered image or not can be judged by detecting an included angle between the plane normal vectors of the target object and the supporting plane thereof in the image. If the included angle is 0°, it means that the plane normal vectors of the target object and the supporting plane thereof are parallel to each other, so the to-be-detected image is a real image. The larger the included angle, the greater the probability that the to-be-detected image is a tampered image.

The image tampering forensics method provided by the present invention will be specified in detail below with reference to the drawings.

Figure 1:
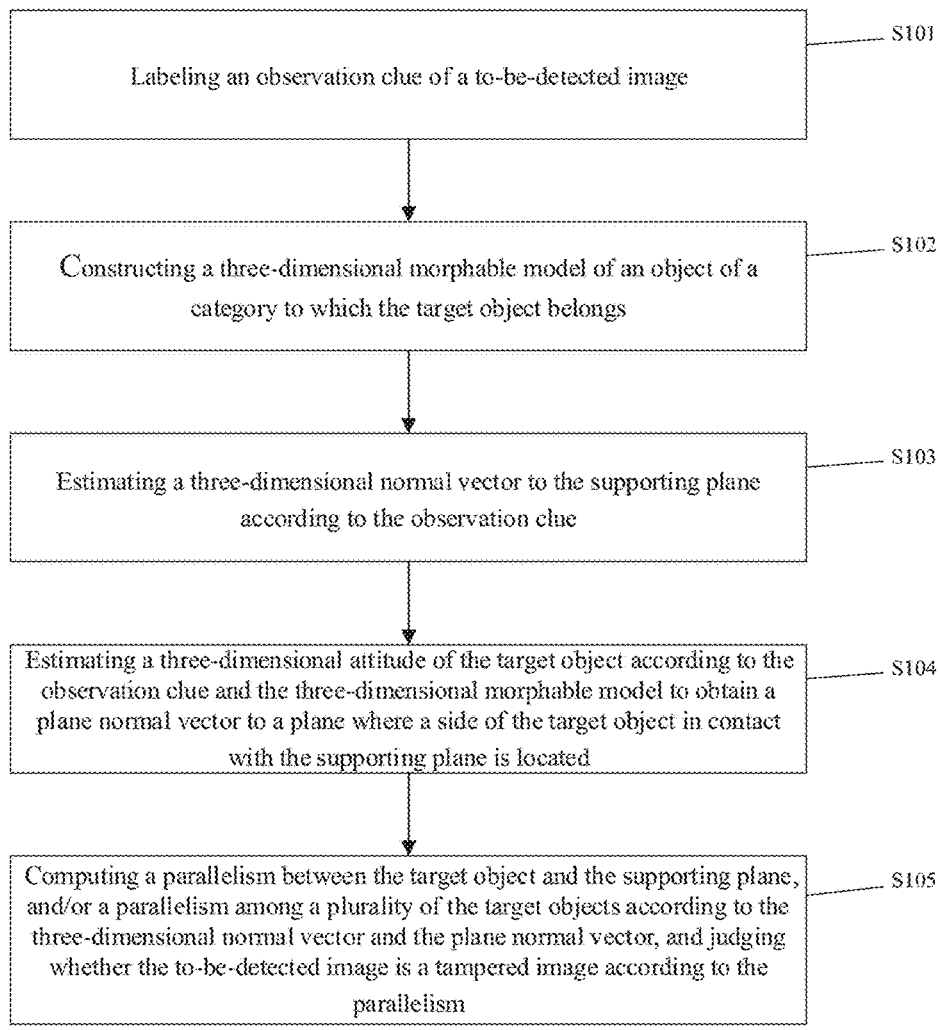
FIG. 1 is an implementing flowchart illustrating an image tampering forensics method according to an embodiment of the present invention.

FIG. 1 exemplarily shows an implementation flow of an image tampering forensics method. As shown in the figure, in the present embodiment, whether the to-be-detected image is a tampered image or not can be judged by following steps. The steps are specified as follows.

Step S101: labeling observation clues of the to-be-detected image.

In the present embodiment, the step of labeling the observation clues of the to-be-detected image includes two aspects, namely, labeling characteristic observation points of the target object and labeling endpoints of straight-line segments of two different directions. The straight-line segments are located in the to-be-detected image and parallel to the supporting plane.

The step of labeling characteristic observation points of the target object may be implemented by labeling contour points of the target object by a method of moving an interactive mouse to form a contour of the target object.

The step of labeling the endpoints of the straight-line segments may be implemented by following steps.

1. Center points for two ends of each of the straight-line segments are labelled by clicking and selecting via an interactive mouse. In the present embodiment, the straight-line segments of the two directions should include a plurality of parallel straight-line segments. For example, the straight-line segments of each direction may include two parallel straight-line segments, i.e. center points of eight endpoints of four straight-line segments should be labeled. Meanwhile, existing straight-line segments located in the to-be-detected image and parallel to the supporting plane may also be selected to label the endpoints.

2. Due to the limitation of display effect of the to-be-detected image, even the existing straight-line segments in the to-be-detected image have a certain degree of ambiguity. Thus, measurement uncertainties of the center points should be configured according to the ambiguity degrees of edge points of the straight-line segments, then the dispersion regions of the center points are labeled according to the measurement uncertainties. In conclusion, the endpoints of the straight-line segments labeled in the present embodiment include the center points and the dispersion region thereof. The uncertainty of center point distribution can be offset by labeling the dispersion regions.

Step S102: constructing a three-dimensional morphable model of an object of a category to which the target object belongs.

Specifically, the object of the category to which the target object belongs is a generic element of the target object, and refers to the object of the category to which the target object belongs. For example, the target object is sneakers, it can be determined that the object of the category to which sneakers belong is shoes, and the shoes may specifically include sneakers, leather shoes, or casual shoes and the like. The three-dimensional morphable model of the object of the category to which the target object belongs refers to the three-dimensional morphable model of shoes.

In the present embodiment, the three-dimensional morphable model of the object of the category to which the target object belongs may be constructed according to the following steps.

1. 3D sample models of a plurality of samples categorized to the object of the category to which the target object belongs are acquired. These samples and the target object belong to the same category. In the present embodiment, the 3D sample models of the samples can be obtained by acquiring 3D sample models already stored in a downloaded graphics software, such as a CAD software, or by three-dimensionally scanning the real objects of the samples through 3D model scanning devices such as Kinect.

2. A semantic correspondence is performed on each vertex of each 3D sample model obtained by step 1. The step pertains to a model registration field of 3D models. Thus, in the present embodiment, the semantic correspondence may be implemented on the vertices of the 3D sample models by a non-rigid registration method such as a non-rigid ICP etc.

3. The 3D sample models subjected to the semantic correspondence are analyzed by the principal component analysis (PCA) method to construct the three-dimensional morphable model of the object of the category to which the target object belongs. This step specifically includes the following steps.

(1) Each 3D sample model is expressed as a one-dimensional column vector. First, the three-dimensional coordinate of each 3D sample model subjected to semantic correspondence is acquired and the three-dimensional coordinate of each vertex of each 3D sample model is used as an element of the one-dimensional column vector. The one-dimensional column vector of the 3D sample model in the present embodiment may be expressed as formula (1) below:

$$S^i = [x_1^i y_1^i z_1^i \ldots x_j^i y_j^i z_j^i \ldots x_{N_v}^i y_{N_v}^i z_{N_v}^i]^T \qquad (1),$$

The meaning of each parameter in formula (1) is described hereinafter. For formula $1 \leq i \leq N_s$, i and $N_s$ refer to a sequence number and a total number of the 3D sample models subjected to the semantic correspondence, respectively. $x_j^i\ y_j^i\ z_j^i$ is a three-dimensional coordinate of the $j_{th}$ vertex in the $i_{th}$ 3D sample model. For formula $1 \leq j \leq N_v$, j and $N_v$ refer to a sequence number and a total number of the vertices of one 3D sample model.

(2) The one-dimensional column vectors of the 3D sample models with the number of $N_s$ are spliced by column to form a 3D sample model matrix.

(3) The 3D sample model matrix obtained by step (2) is analyzed through the principal component analysis (PCA) method to obtain the three-dimensional morphable model $(S^0, \Phi)$ of the object of the category to which the target object belongs, where $S^0$ is an average shape, $\Phi$ is a principal change direction matrix. Each column of the principal change direction matrix $\Phi$ represents an outstanding shape change direction. Meanwhile, a dimension of each column is identical to a dimension of the one-dimensional column vector $S^i$ of the 3D sample model. In the present embodiment, according to the three-dimensional morphable model $(S^0, \Phi)$, a new shape of the object of the category to which the target object belongs may be expressed as a linear equation as formula (2) below:

$$S(\theta_s) = S^0 + \Phi \theta_s \qquad (2),$$

where $\theta_s$ is a three-dimensional shape parameter.

Step S103: a three-dimensional normal vector to the supporting plane is estimated according to the observation clues. The step is specified as follows.

1. First, the endpoints of the straight-line segments of two different directions parallel to the supporting plane and labeled in the to-be-detected image are sampled to obtain the endpoint coordinates of the straight-line segments. In the present embodiment, the endpoints of the straight-line segments may be sampled by using the method of Gaussian distribution sampling. Specifically, the two-dimensional coordinates of the center points of the endpoints may be set as an average value of the Gaussian distribution, and the measurement uncertainty of each center point is set as a standard deviation of the Gaussian distribution.

2. Based on a rule that parallel lines that are not parallel to the imaging plane will intersect at a vanishing point, the vanishing points of the to-be-detected image in two different directions may be computed according to the endpoints. A vanishing line of the supporting plane may be obtained by connecting the two vanishing points.

In the present embodiment, the vanishing points of the two different directions may be computed by using a method of maximum likelihood estimation to make the endpoints of observation straight-line segment have the largest likelihood probability. After obtaining the coordinates of the two vanishing points, the equation of the vanishing line may be constructed by a formula for computing a straight-line equation given two points.

3. The three-dimensional normal vector to the supporting plane is computed according to formula (3) below, formula (3) is specifically expressed as follows:

$$n = K^T l \qquad (3).$$

The meaning of each parameter in formula (3) is described hereinafter. n is the three-dimensional normal vector to the supporting plane in a camera coordinate system. K is a matrix of camera intrinsic parameters. T is a notation of matrix transposition. l is the equation of the vanishing line. In the present embodiment, the camera intrinsic parameters may be obtained by regular methods. In a first aspect, assuming that the matrix of camera intrinsic parameters is known, wherein the optical center position of the camera is located at the center of the to-be-detected image, and the focal length of the camera is obtained by a photo header file of the camera, such as EXIF. In another aspect, camera intrinsic parameters may be obtained by computing three groups of parallel straight lines that are perpendicular to each other in the to-be-detected image.

As stated in step S101, the endpoints of the straight-line segments include certain dispersion regions. Thus, in the present embodiment, the endpoints of the straight-line segments may be sampled for multiple times. For example, a number of times of the sampling is set as 500 and steps 1-3 are executed repeatedly to obtain the three-dimensional normal vectors to multiple groups of the supporting planes.

Step S104: a three-dimensional attitude of the target object is estimated according to the observation clues and the three-dimensional morphable model to obtain a plane normal vector to a plane where a side of the target object in contact with the supporting plane is located. In the present embodiment, the contour of the target object obtained by labeling the characteristic observation points of the target object in step S102 is taken as a fitting target, and the three-dimensional morphable model constructed in step S102 is fitted to obtain the three-dimensional attitude parameters and three-dimensional shape parameters of the three-dimensional attitude of the target object. Ultimately, the plane normal vector is determined according to the parameters of the three-dimensional attitude of the target object. The details are described below.

1. The target function for fitting the three-dimensional morphable model is constructed according to the characteristic observation points of the target object in the to-be-detected image and the three-dimensional morphable model. The computation formula of the target function is shown as formula (4) below:

$$\operatorname*{argmin}_{\theta_p, \theta_s} \sum_{n=1}^{N} \min_m \|c_n - \hat{c}_m(\theta_p, \theta_s; \theta_c)\|^2. \qquad (4)$$

The meaning of each parameter in formula (4) is described hereinafter. N and n refer to a total number and a sequence number of the characteristic observation points of the target object in the to-be-detected image, respectively. $c_n$ is the $n_{th}$ characteristic observation point of the target object. $\hat{c}_m$ is the $m_{th}$ characteristic observation point of a two-dimensional projection of the three-dimensional morphable model. $\|c_n - \hat{c}_m(\theta_p, \theta_s; \theta_c)\|^2$ is a square of an Euclidean distance between the characteristic observation point $c_n$ and the characteristic observation point $\hat{c}_m$. $\theta_p$ and $\theta_s$ refer to a three-dimensional attitude parameter and a three-dimensional shape parameter of the target object, respectively. $\theta_c$ is a camera intrinsic parameter. In the present embodiment, the optimization target of the target function is to minimize the Euclidean distance between the contour of the target object in the to-be-detected image and the contour of the two-dimensional projection of the three-dimensional morphable model by optimizing the three-dimensional attitude parameter and the three-dimensional shape parameter of the target object. In the present embodiment, the characteristic observation point $c_n$ is a contour point of the target object in the to-be-detected image. The characteristic observation point $\hat{c}_m$ is a contour point of the two-dimensional projection of the three-dimensional morphable model.

Specifically, the characteristic observation point $\hat{c}_m$ may be obtained according to formula (5) below:

$$\hat{c}_m = \mathbb{C}(P(\theta_p; \theta_c) S(\theta_s)) \qquad (5).$$

Specifically, the constraint condition of the target function is shown as formula (6) below:

$$|(\theta_s)_n| \le k\sigma_n \qquad (6).$$

The meaning of each parameter in formula (5) and (6) is described hereinafter. $\mathbb{C}$ represents an operation of extracting the contour from the two-dimensional projection of the three-dimensional morphable model. $(\theta_s)_n$ is the $n_{th}$ component of the three-dimensional shape parameter of the target object. $\sigma_n$ is a standard deviation in the $n_{th}$ principal component direction when the three-dimensional morphable model is constructed by the principal component analysis method. k is a predetermined constant.

2. An optimization computation is implemented on the target function to obtain the optimized three-dimensional attitude parameter and three-dimensional shape parameter of the target object. In the present embodiment, the target function may be optimized by using an iterative closest point algorithm. The details are described below.

(1) A parameter initialization is implemented on the target function for one time. Specifically, the parameter includes the three-dimensional attitude parameter and the three-dimensional shape parameter.

(2) The characteristic observation points of the two-dimensional projection of the three-dimensional morphable model closest to the characteristic observation points of the target object in the to-be-detected image are acquired. A corresponding relationship between the three-dimensional morphable model and the two-dimensional projection thereof is corrected according to a corresponding relationship between each characteristic observation point of the target object in the to-be-detected image and the corresponding closest point.

(3) A parameter optimization is implemented on the corrected three-dimensional morphable model, and whether a residual of the target function satisfies a convergence condition or reaches a predetermined number of iterations is judged. If the residual of the target function does not satisfy the convergence condition and/or does not reach the predetermined number of iterations, return to step (1) to re-correct the corresponding relationship between the three-dimensional morphable model and the two-dimensional projection thereof after the parameter optimization. Specifically, in the present embodiment, the parameter optimization may be implemented by a least square method.

As shown in formula (4), due to the severe nonconvexity of the target function, the optimization result depends on the selection of initial values of the parameters. In the present embodiment, in order to reduce the uncertainty of the optimization result caused by the initial values of the parameters, multiple times of iterative computation should be implemented and the parameters of the target function are initialized in each iteration. For example, the number of times of the parameter initialization is set as 20, a plurality groups of the three-dimensional attitude parameters and three-dimensional shape parameters after optimization can be obtained, so as to obtain a plurality of groups of plane normal vectors of the target object. Specifically, the parameter initialization of the target function may be implemented according to following steps. Specifically, first, according to a given predetermined parameter value, a parameter dispersion region centered at the predetermined parameter value is set, and then a parameter in the parameter dispersion region is randomly selected as an initial parameter for the parameter initialization of the target function.

Further, the present embodiment provides a preferred technical solution for optimizing the target function. Specifically, the optimization computation of the target functions corresponding to multiple target objects that share a group of three-dimensional shape parameters may be implemented simultaneously to reduce the degrees of freedom of the parameters and improve the fitting precision of the target objects. For example, for a person standing on the ground, there is a plane contact relationship between the person's two shoes and the ground, and the two shoes satisfy coplanar constraint and share a group of three-dimensional shape parameters, so the optimization computation of the target functions corresponding to the two shoes may be implemented simultaneously.

Step S105: the parallelism between the target object and the supporting plane, and/or among a plurality of the target objects is computed, and whether the to-be-detected image is a tampered image is judged according to the parallelism. In the present embodiment, attitude consistency of the to-be-detected image is evaluated by using the parallelism of difference planes. The parallelism of difference planes may be expressed by an included angle of normal vectors to the different planes.

As stated in step S103, multiple groups of three-dimensional normal vectors are obtained in the estimation process of the three-dimensional normal vectors to the supporting plane. As stated in step S104, multiple groups of plane normal vectors are obtained in the estimation process of the plane normal vectors of the plane where a side of the target object in contact with the supporting plane is located. In the present embodiment, the three-dimensional normal vectors and the plane normal vectors are all regarded as points on a plane, i.e. set $\mathcal{P}$ may be used to represent a distribution set of the plane normal vectors of one target object, and set $\mathcal{Q}$ may be used to represent a distribution set of the three-dimensional normal vectors to the supporting plane or a distribution set of the plane normal vectors of another target object. Specifically, the parallelism between the target object and the supporting plane, and/or the parallelism among a plurality of the target objects may be computed according to formula (7) below:

$$D_{avr}(\mathcal{P},\mathcal{Q}) = \text{Ang}(p_0, q_0) \quad (7).$$

The meaning of each parameter in formula (7) is described hereinafter. $D_{avr}(\mathcal{P},\mathcal{Q})$ is an included angle between average directions of the distribution set $\mathcal{P}$ and the distribution set $\mathcal{Q}$. $p_0$ is a weighted average value of the distribution set $\mathcal{P}$. $q_0$ is a weighted average value of the distribution set $\mathcal{Q}$. Ang is a function for computing the included angle.

Specifically, the computation method of the weighted average values of the distribution set $\mathcal{P}$ and the distribution set $\mathcal{Q}$ are identical. Thus, one arbitrary distribution set $\mathcal{G}$ is set in the present embodiment. The distribution set $\mathcal{G}$ may be a distribution set of the plane normal vectors of the target object or a distribution set of the three-dimensional normal vectors to the supporting plane. Taking the distribution set $\mathcal{G}$ as an example, the computation method of the weighted average value is introduced. Specifically, a weighted average value $g_0$ of the distribution set $\mathcal{G}$ may be computed according to the formula (8) below:

$$g_0 = \frac{\sum_{a=1}^{A} \frac{1}{e_a^2} g_a}{\sum_{a=1}^{A} \frac{1}{e_a^2}}. \quad (8)$$

The meaning of each parameter in formula (8) is described hereinafter, $g_a$ is the $a_{th}$ normal vector in the distribution set $\mathcal{G}$. A is a total number of normal vectors in the distribution set $\mathcal{G}$. $e_a$ is a residual of the $a_{th}$ normal vector $g_a$. When the distribution set $\mathcal{G}$ is the distribution set of the plane normal vectors of the target object, the value of the residual $e_a$ is a residual satisfied the convergence condition and obtained by implementing an optimization computation on the target function for constructing the three-dimensional morphable model. When the distribution set $\mathcal{G}$ is a distribution set of the three-dimensional normal vectors to the supporting plane, the value of the residual $e_a$ is a fixed constant, for example, $e_a$ may be 1.

In the present embodiment, parallelism between the target object and the supporting plane and/or among a plurality of the target objects is computed, and then whether the to-be-detected image is a tampered image is judged according to the parallelism. The larger the parallelism, the greater the probability that the to-be-detected image is a tampered image.

Preferably, the present invention further provides a technical solution for computing a parallelism threshold used for judging whether the to-be-detected image is a tampered image and a probability of tampering under the case where the parallelisms of real target objects and tampered target objects in the to-be-detected image are known. Specifically, the probability of tampering of the to-be-detected image may be computed according to following steps.

1. A parallelism probability density distribution of the real target object and tampered target object in the to-be-detected image is acquired.

2. The probability of tampering of the to-be-detected image is computed according to formula (9) below:

$$P(y=1\mid D)=\frac{f(D\mid y=1)P(y=1)}{f(D\mid y=1)P(y=1)+f(D\mid y=0)P(y=0)}. \quad (9)$$

The meaning of each parameter in formula (9) is described hereinafter. y=1 represents that the to-be-detected image is a tampered image. y=0 represents that the to-be-detected image is a real image. D is the parallelism between the target object and the supporting plane in the to-be-detected image. P(y=1|D) represents a probability that the to-be-detected image is a tampered image when the parallelism of the target object is D. $f(D|y=1)$ represents the probability density of the parallelism D when the to-be-detected image is a tampered image. $f(D|y=0)$ represents the probability density of the parallelism D when the to-be-detected image is a real image.

In the present embodiment, priori probabilities are similar when the to-be-detected image is a tampered image and when the to-be-detected image is a real image, i.e. P(y=1) =P(y=0). Thus, formula (9) may be transformed as below:

$$P(y=1\mid D)=\frac{f(D\mid y=1)}{f(D\mid y=1)+f(D\mid y=0)}. \quad (10)$$

In the present embodiment, the parallelisms between a plurality of target objects and supporting planes may be compared. In combination of the probability of tampering of the target objects obtained by solving formula (10), whether the to-be-detected image is a tampered image is judged comprehensively. For example, there are two persons standing on the ground, and assuming that shoes wearing by one person are A, shoes wearing by another person are B, two shoes of a person are target objects, and the ground is a supporting plane. The parallelism between shoes A and the ground is 0.59°, and the probability of tampering is 15.6%. The parallelism between shoes B and the ground is 16.56°, and the probability of tampering is 96.90/%. Parallelism between the two pairs of shoes is 16.63°, and the probability of tampering is 96.9%. Based on the above data, it can be determined that shoes B is a tampered image, and shoes A are real images. Thus, the to-be-detected image "the person wearing shoes B" is a tampered image.

3. Parallelism $D_{50\%}$ is computed according to formula (10) when P(y=1|D)=50% and the parallelism $D_{50\%}$ is regarded as a parallelism threshold. When the parallelism between the target object and the supporting plane in the to-be-detected image is greater than the parallelism threshold, the to-be-detected image is determined to be a tampered image. When the parallelism between the target object and the supporting plane in the to-be-detected image is not greater than the parallelism threshold, the to-be-detected image is determined to be a real image. In the present embodiment, for the above to-be-detected image "persons standing on the ground", the parallelism $D_{50\%}$=4.61° is obtained by solving formula (10). Due to 0.59°<4.61°, shoes A are real images. Due to 16.56°>4.61°, shoes B are tampered images. Thus, the to-be-detected image "persons standing on the ground" is a tampered image.

The image tampering forensics method provided by the present embodiment is based on computer vision and image recognition technology. By detecting the parallelism between the target object and the supporting plane which have a plane contact relationship in the to-be-detected image, whether the to-be-detected image is a tampered image is judged. The method does not rely on statistical features of tiny images in the to-be-detected image. Thus, the method can effectively implement tampering forensics to a low quality image.

Although the steps are described in sequence as mentioned in the above embodiments, those skilled in the art should be able to understand that in order to achieve the effect of the present embodiment, the steps do not need to be executed according to the order. The steps may be executed simultaneously (in parallel) or reversely. These simple changes all fall within the scope of the present invention.

Hereinafter, a to-be-detected image including the ground, a wall, a ceiling, two persons standing on the ground, and a bucket placed on the ground is taken as an example to verify the effects of the image tampering forensics method provided by the present invention. The details are described below.

1. The to-be-detected image includes multiple groups of target object and supporting plane which have a plane contact relationship. In the present embodiment, shoes of the persons standing on the ground are selected to be the target objects, and the ground serves as the supporting plane. Further, the shoes being worn by the person standing at the left side in the to-be-detected image are set as ID1, and the shoes being worn by the person standing at the right side are set as ID2. And, the bucket and the person standing at the left side are real images, while the person standing at the right side is an image spliced to the to-be-detected image.

2. Contour points of shoes ID1 and ID2 are labeled by the method of moving an interactive mouse.

3. Since there is a plurality of straight-line segments on the ceiling of the to-be-detected image parallel to the ground, two groups of straight-line segments perpendicular to each other are selected in the present embodiment. Each group of straight-line segments includes two parallel straight-line segments. Each endpoint of each straight-line segment is labeled by the method of clicking and selecting through an interactive mouse.

4. 3D sample models of shoe samples available in CAD software are acquired by downloading through network. In the present embodiment, the 3D sample models of shoes samples mainly include multiple kinds of 3D sample models, such as 3D sample models of sneakers, 3D sample models of leather shoes, and 3D sample models of casual shoes etc.

Figure 8:
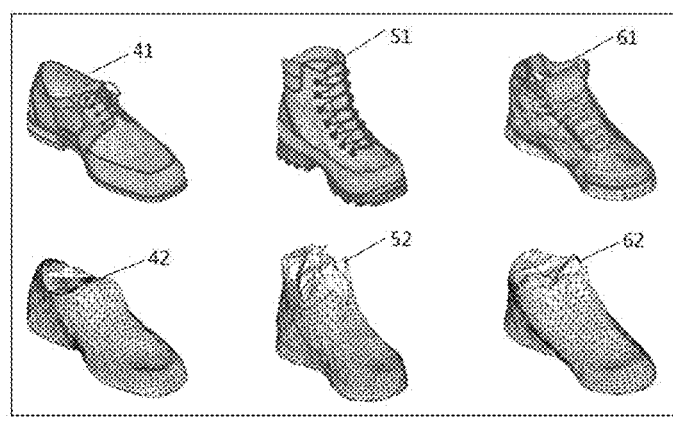
FIG. 8 is a diagram illustrating a 3D sample model subjected to semantic correspondence.

5. Model registration is implemented on all 3D sample models to achieve a semantic correspondence of each vertex of each 3D sample model. FIG. 8 exemplarily shows the 3D sample models subjected to semantic correspondence. As shown in the figure, the first row includes 3D sample model 41 of a leather shoe, 3D sample model 51 of a casual shoe, and 3D sample model 61 of a sneaker, before the model registration. The second row includes 3D sample model 42 of a leather shoe, 3D sample model 52 of a casual shoe, and 3D sample model 62 of a sneaker, after the model registration.

Figure 4:
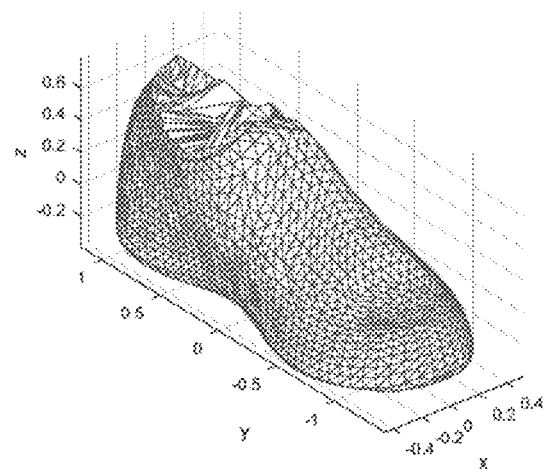
FIG. 4 is a diagram illustrating a three-dimensional morphable model of a shoe according to an embodiment of the present invention.

6. All 3D sample models subjected to semantic correspondence are analyzed by the principal component analysis method to obtain the three-dimensional morphable model of objects of the shoe category. FIG. 4 exemplarily shows the diagram illustrating the three-dimensional morphable model of a shoe.

Figure 5:
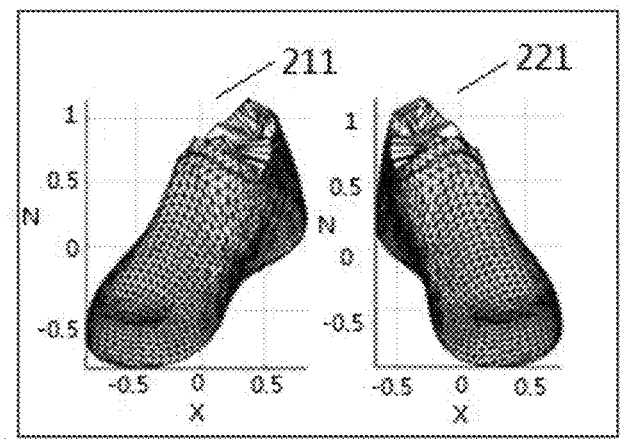
FIG. 5 is a diagram illustrating a three-dimensional attitude obtained by fitting a three-dimensional morphable model according to target object ID1.
Figure 6:
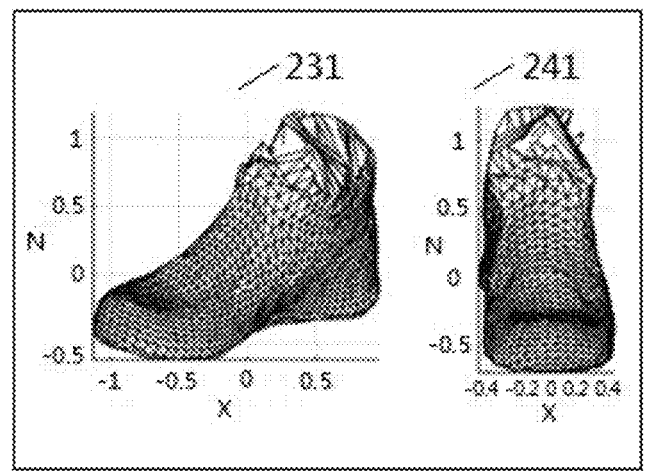
FIG. 6 is a diagram illustrating a three-dimensional attitude obtained by fitting a three-dimensional morphable model according to target object ID2.
Figure 9:
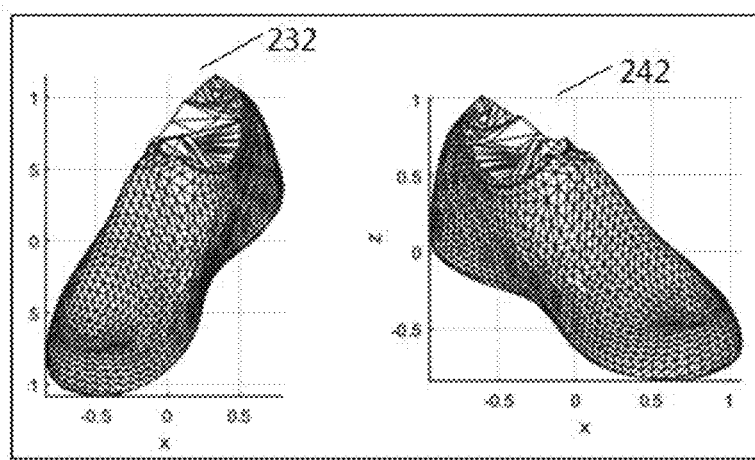
FIG. 9 is a first diagram illustrating a three-dimensional attitude obtained by fitting a three-dimensional morphable model.
Figure 10:
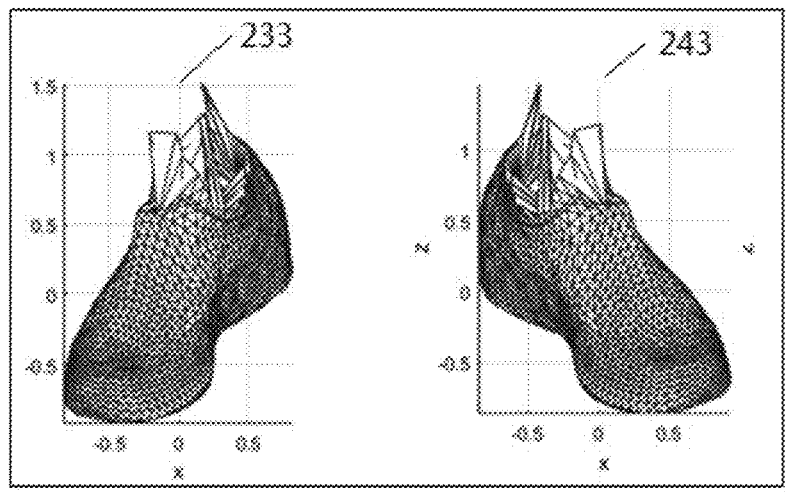
FIG. 10 is a second diagram illustrating a three-dimensional attitude obtained by fitting a three-dimensional morphable model.
Figure 11:
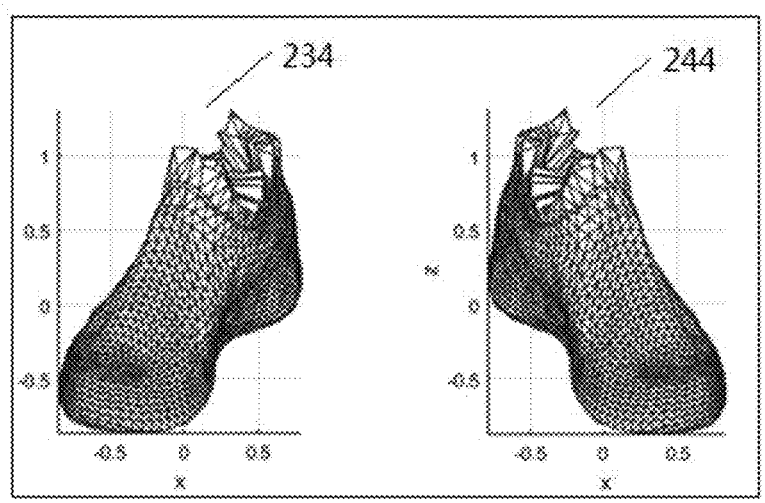
FIG. 11 is a third diagram illustrating a three-dimensional attitude obtained by fitting a three-dimensional morphable model.

7. According to the contour points of shoes ID1 and ID2 labeled in step 2, and the three-dimensional morphable models of the shoe objects obtained in step 6, the distribution set of the plane normal vectors of bottom surface of shoes ID1 and the distribution set of the plane normal vectors of bottom surface of shoes ID2 are estimated. FIG. 5 exemplarily shows the diagram illustrating the three-dimensional attitude obtained by fitting the three-dimensional morphable model according to the target object ID1. As shown in the figure, the left-side image is the three-dimensional attitude 211 of the left shoe of shoes ID1, and the right-side image is the three-dimensional attitude 221 of the right shoe of shoes ID1. FIG. 6 exemplarily shows the diagram illustrating the three-dimensional attitude obtained by fitting the three-dimensional morphable model according to the target object ID2. As shown in the figure, the left-side image is the three-dimensional attitude 231 of the left shoe of shoes ID2, and the right-side image is the three-dimensional attitude 241 of the right shoe of shoes ID2. FIG. 9~14 exemplarily show diagrams illustrating the three-dimensional attitudes obtained by fitting the three-dimensional morphable models. As shown in the figures, the left-side image in FIG. 9 is the initial three-dimensional attitude 232 of the left shoe of shoes ID2, the right-side image is the initial three-dimensional attitude 242 of the right shoe of shoes ID2. The left-side image in FIG. 10 is the intermediate three-dimensional attitude 233 of the left shoe of shoes ID2, the right-side image is the intermediate three-dimensional attitude 243 of the right shoe of shoes ID2. The left-side image in FIG. 11 is the final three-dimensional attitude 234 of the left shoe of shoes ID2, the right-side image is the final three-dimensional attitude 244 of the right shoe of shoes ID2.

8. According to the endpoints of the straight-line segments labeled in step 3, the distribution set of the three-dimensional normal vectors to the ground is estimated.

Figure 7:
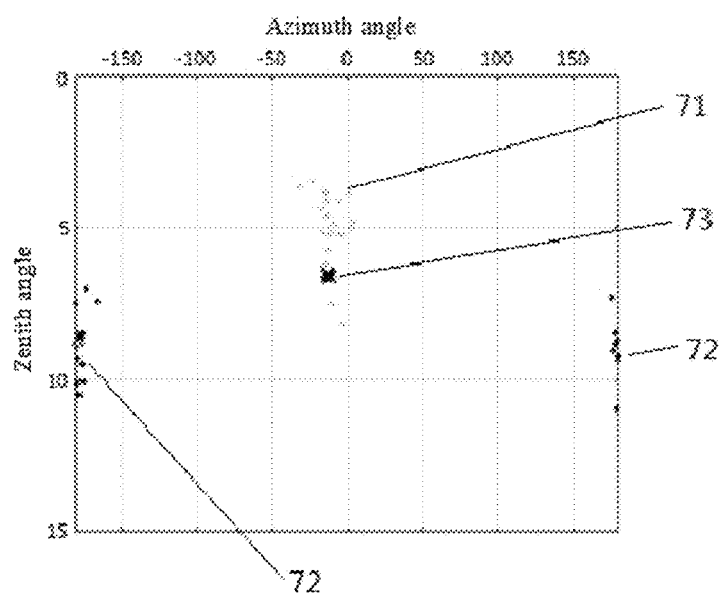
FIG. 7 is a diagram illustrating a distribution set of normal vectors.

FIG. 7 exemplarily shows the distribution set of the normal vectors. As shown in the figure, the abscissa and the ordinate represent an azimuth angle and a zenith angle of the normal vector, respectively. The plane normal vector distribution 71 of shoes ID1, the plane normal vector distribution 72 of shoes ID2, and the three-dimensional normal vector distribution 73 of the ground are all presented in a two-dimensional coordinate system in a form of point sets. One point in each point set represents one normal vector.

9. According to the distribution sets obtained in step 7 and step 8, and an included angle between the average directions of each two distribution sets is computed by formula (7) and (8). Namely, the parallelism between shoes ID1 and shoes ID2, the parallelism between shoes ID1 and the ground, and the parallelism between shoes ID2 and the ground are obtained. After computing the experiment data, the parallelism between shoes ID1 and the ground is 0.59°, the parallelism between shoes ID2 and the ground is 16.56°, and the parallelism between the two pair of shoes is 16.63°. As stated above, the larger the parallelism, the greater the probability that the to-be-detected image or the target object is a tampered image. Thus, based on above data, it can be determined that shoes ID2 are tampered images, and shoes ID1 are real images. The judging result is identical to the result given in step 1, which indicates that the image tampering forensics method is able to effectively detect whether the to-be-detect image is a tampered image or not.

Figure 12:
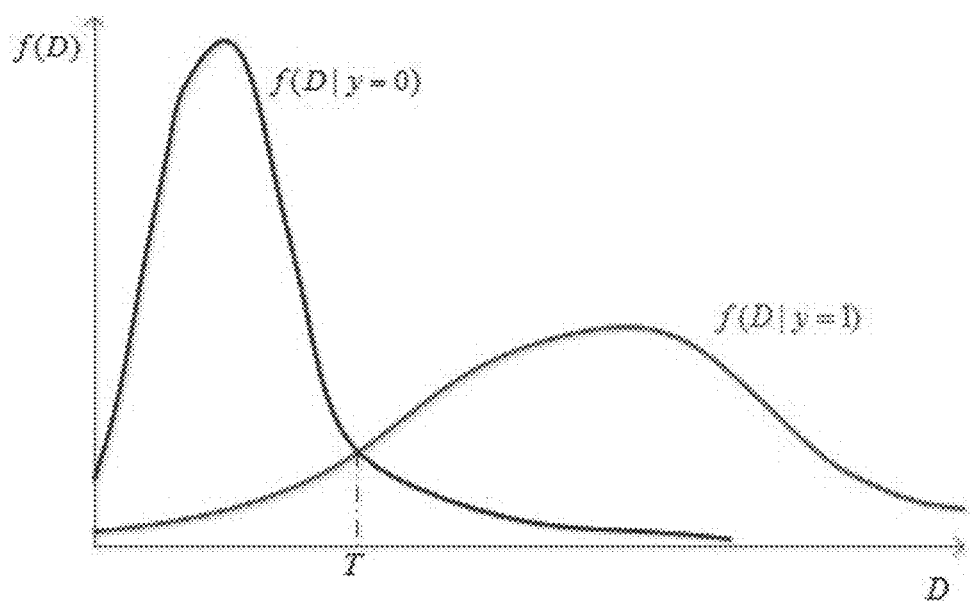
FIG. 12 shows a parallelism probability density distribution of a real target object and a tampered target object.

10. The parallelism probability density distribution of shoes ID1 and shoes ID2 are acquired according to the experiment data, and the probability of tampering of the to-be-detected image is computed by formula (9) and (10) to obtain the parallelism threshold. FIG. 12 exemplarily shows the parallelism probability density distribution of the real target object and the tampered target object. As shown in the figure, the intersection point of the two curves is the parallelism threshold. Namely, the point at which the probability of tampering is 50%. The parallelism threshold $D_{50\%}=4.61°$ is obtained by computing formula (10). Upon computation, it can be obtained that the parallelism between the bucket and the ground in the to-be-detected image is less than 4.61°, so it can be determined that the bucket is a real image.

In the present embodiment, the parallelism of the known real target object and spliced target object in the to-be-detected image is detected and the image is judged to obtain the judging result. The judging result is identical to the known result. Thus, it proves that the image tampering forensics method provided by the present invention is able to effectively detect whether the to-be-detected image is a tampered image or not.

Based on a technical concept identical to the method embodiment, the present embodiment further provides an image tampering forensics apparatus. The image tampering forensics apparatus is specified in combination of the drawings as follows.

Figure 3:
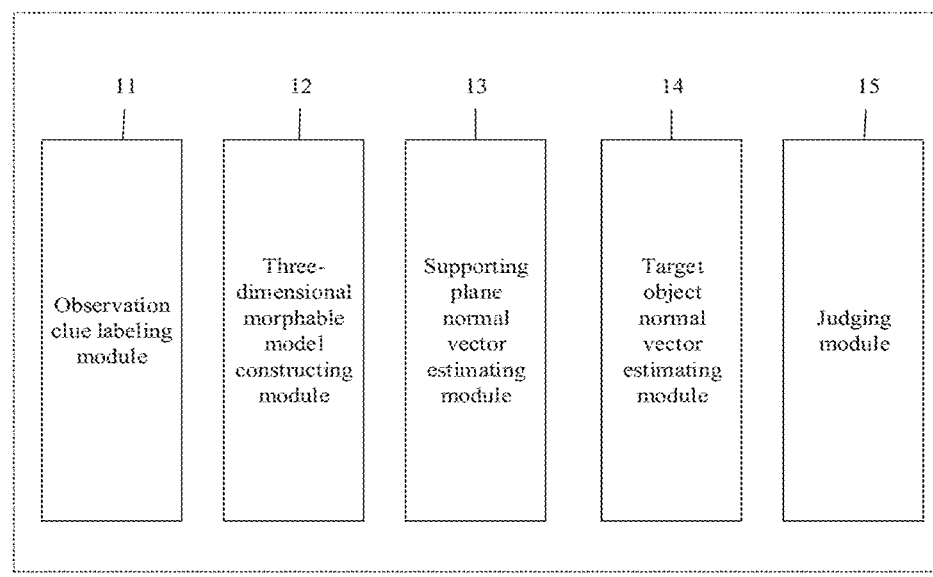
FIG. 3 is a structural diagram illustrating an image tampering forensics apparatus according to an embodiment of the present invention.

FIG. 3 exemplarily shows the structure of the image tampering forensics apparatus in the present embodiment. As shown in the figure, the image tampering forensics apparatus in the present embodiment may include observation clue labeling module 11, three-dimensional morphable model constructing module 12, supporting plane normal vector estimating module 13, target object normal vector estimating module 14, and judging module 15. The observation clue labeling module 11 is configured to label the observation clues of the to-be-detected image. The three-dimensional morphable model constructing module 12 is configured to construct the three-dimensional morphable model of the object of the category to which the target object belongs. The supporting plane normal vector estimating module 13 is configured to estimate the three-dimensional normal vector to the supporting plane according to the observation clues. The target object normal vector estimating module 14 is configured to estimate the three-dimensional attitude of the target object according to the observation clues and the three-dimensional morphable model to obtain the plane normal vector to a plane where a side of the target object in contact with the supporting plane is located. The judging module 15 is configured to compute the parallelism between the target object and the supporting plane, and/or among a plurality of the target objects according to the three-dimensional normal vector and the plane normal vector, and judge whether the to-be-detected image is a tampered image or not according to the parallelism.

Further, the observation clue labeling module 11 in the present embodiment may further be configured to label a first labeling unit of the characteristic observation points of the target object in the to-be-detected image, and to label a second labeling unit of the endpoints of the straight-line segments of two different directions in the to-be-detected image. The straight-line segments are parallel to the supporting plane.

Further, the three-dimensional morphable model constructing module 12 in the present embodiment may include a model registration unit and a model constructing unit. The model registration unit is configured to acquire 3D sample models of samples of a plurality of objects categorized to the category to which the target object belongs, and to implement a semantic correspondence to each vertex of each 3D sample model. The model constructing unit is configured to construct the three-dimensional morphable model by the principal component analysis method according to the 3D sample model subjected to semantic correspondence.

Further, the supporting plane normal vector estimating module 13 in the present embodiment may further include a vanishing point computing unit, a vanishing line computing unit, and a three-dimensional normal vector computing unit. The vanishing point computing unit is configured to sample the endpoints of the straight-line segments of two different directions parallel to the supporting plane and labeled in the to-be-detected image, and compute the vanishing points of the two different directions in the to-be-detected image according to the sampled endpoints. The vanishing line computing unit is configured to construct the equation of the vanishing line of the supporting plane according to the three-dimensional homogeneous coordinates of the vanishing points. The three-dimensional normal vector computing unit is configured to compute the three-dimensional normal vector to the supporting plane according to the equation of the vanishing line and the camera intrinsic parameters.

Further, the target object normal vector estimating module 14 in the present embodiment may further include a target function constructing unit, a target function optimizing computational unit, and a plane normal vector computing unit. The target function constructing unit is configured to construct the target function for fitting the three-dimensional morphable model according to the characteristic observation points of the target object in the to-be-detected image and the three-dimensional morphable model. The target function optimizing computational unit is configured to implement optimization computation for the target function to obtain optimized three-dimensional attitude parameters and three dimensional shape parameters of the target object. The plane normal vector computing unit is configured to compute the plane normal vector to the plane where a side of the target object in contact with the supporting plane is located according to the three-dimensional attitude parameters.

Further, the judging module 15 in the present embodiment may further include a parallelism computing unit. The parallelism computation models included in the parallelism computing unit are expressed as formulas (7) and (8).

Preferably, the present embodiment further provides a preferred embodiment of the image tampering forensics apparatus. Specifically, the image tampering forensics apparatus in the present embodiment further includes a parallelism threshold computing unit and a tampering probability computing unit. The computation models of the tampering probability computing unit are expressed as formulas (9) and (10). The parallelism threshold computing unit is configured to compute the corresponding parallelism $D_{50\%}$ when the probability of tampering is 50%. The parallelism $D_{50\%}$ is used as the parallelism threshold.

The image tampering forensics apparatus described in the above embodiment may be used to execute the image tampering forensics method described in the above embodiment. The technical principle, technical problems to be solved, and technical effects of the image tampering forensics apparatus and the image tampering forensics method are similar. Those skilled in the art can clearly understand that for the sake of convenient and brief description, the specific working process and related description of the image tampering forensics described above may be referred to the corresponding process in the foregoing embodiment of the image tampering forensic method, thus the details are not repeated here.

Those skilled in the art should be able to understand that the above image tampering forensics apparatus also includes some other well-known structures, such as a processor, a controller, a memory, etc. The memory includes, but is not limited to, a random access memory, a flash memory, a read only memory, a programmable read only memory, a volatile memory, a non-volatile memory, a serial memory, a parallel memory, or a register etc. The processor includes but not limited to a CPLD/FPGA, a DSP, an ARM processor, and a MIPS processor, etc. In order not to unnecessarily obscure the embodiment of the present disclosure, these well-known structures are not shown in FIG. 3.

Those skilled in the art should be able to understand that the modules in the apparatus of the embodiments can be adaptively changed and placed in one or more apparatuses different from the embodiment. The modules or units or components of the embodiments may be combined into one module or unit or component. Additionally, further the modules or units or components of the embodiments may also be divided into a plurality of sub-modules or sub-units or sub-components. In addition to at least some mutually exclusive features and/or processes or units, all features disclosed in the specification (including the appending claims, the abstract and the drawings), and all processes or units of any method or apparatus disclosed in the same way may be combined in any manner. Each feature disclosed in the specification (including the appending claims, the abstract and the drawings) may be replaced by alternative features that are used for the same, equivalent or similar purpose, unless otherwise stated.

In addition, those skilled in the art should be able to understand that although some embodiments described herein include certain features but not other features that are included in other embodiments, the arbitrary combination of features of different embodiments means that different embodiments formed by the arbitrary combination fall within the scope of the present invention. For example, any embodiment claimed in the following claims can be implemented in any combination.

The various component embodiments of the present invention may be implemented in hardware, or in a software module running on one or more processors, or in a combination thereof. Those skilled in the art should be able to understand that a microprocessor or digital signal processor (DSP) may be used in practice to implement some or all of the functionality of some or all components of the servers and client ends in accordance with the embodiments of the present invention. The present invention may also be implemented as an apparatus or device program (e.g., a PC program and a PC program product) for executing some or all of the methods described herein. Such a program for implementing the present invention may be stored on a PC readable medium or may be in the form of one or more signals. Such signals may be downloaded from an Internet website, provided on a carrier signal, or provided in any other form.

It should be noted that the above-described embodiments are intended to illustrate the present invention rather than limit the present invention. Those skilled in the art can devise alternative embodiments without departing from the scope of the appended claims. In the claims, any reference designator placed in the parentheses shall not be construed as a limitation of the claims. The word "comprising" means that the elements or steps that are not listed in the claims are not excluded. The word "a/an" or "one" placed before the elements does not exclude the case of multiple elements. The present invention can be implemented by means of hardware including several different elements and by means of a suitably programmed PC. In the unit claims reciting several means, several of these means can be embodied by the same hardware item. The use of the words first, second, and third does not indicate any order. These words can be interpreted as names.

Heretofore, the technical solutions of the present invention have been described in combination of the preferred embodiments shown in the drawings. However, those skilled in the art can readily understand that the scope of the present invention is obviously not limited to these specific embodiments. Those skilled in the art can make equivalent changes or substitutions to the related technical features without departing from the principles of the present invention. The technical solutions obtained from modifications and substitutions will still fall within the scope of the present invention.

What is claimed is:

1. An image tampering forensics method comprising:
labeling an observation clue of a to-be-detected image, wherein the to-be-detected image includes a target object and a supporting plane, the target object and the supporting plane have a plane contact relationship;
constructing a three-dimensional morphable model of an object of a category to which the target object belongs;
estimating a three-dimensional normal vector to the supporting plane according to the observation clue;
estimating a three-dimensional attitude of the target object according to the observation clue and the three-dimensional morphable model to obtain a plane normal vector to a plane where a side of the target object in contact with the supporting plane is located; and
computing a parallelism between the target object and the supporting plane, and among a plurality of the target objects according to the three-dimensional normal vector and the plane normal vector, and judging whether the to-be-detected image is a tampered image according to the parallelism, wherein the parallelism is an included angle of normal vectors to different planes;
wherein the step of labeling the observation clue of the to-be-detected image comprises:
labeling at least one characteristic observation point of the target object in the to-be-detected image, and labeling a plurality of endpoints of a plurality of straight-line segments in two different directions in the to-be-detected image, wherein the plurality of straight-line segments are parallel to the supporting plane;
wherein the at least one characteristic observation point includes at least one contour point of the target object; the plurality of straight-line segments of different directions include a plurality of parallel straight-line segments.

2. The image tampering forensics method according to claim 1, wherein
the step of labeling the at least one contour point of the target object comprises labeling the at least one contour point of the target object by moving an interactive mouse; and
labeling the plurality of endpoints of the plurality of straight-line segments comprises:
labeling a center point for each of two endpoints of each straight-line segment by clicking and selecting through the interactive mouse; and
configuring a measurement uncertainty of the center point according to an ambiguity degree of the two edge points of each straight-line segment, and labeling a dispersion region of the center point according to the measurement uncertainty.

3. The image tampering forensics method according to claim 1; wherein the step of constructing the three-dimensional morphable model of the object of the category to which the target object belongs comprises:

acquiring a plurality of 3D sample models of a plurality of samples of the object categorized to the category to which the target object belongs, and implementing a semantic correspondence to each vertex of the at least one 3D sample model; and
constructing the three-dimensional morphable model by a principal component analysis method according to the plurality of 3D sample models subjected to the semantic correspondence.

4. The image tampering forensics method according to claim 3, wherein the step of acquiring the plurality of 3D sample models of the plurality of samples of the object categorized to the category to which the target object belongs comprises acquiring a plurality of predetermined 3D sample models in a graphics software, or acquiring the plurality of 3D sample models of the plurality of samples by a 3D model scanning device.

5. The image tampering forensics method according to claim 3, wherein the step of implementing the semantic correspondence to each vertex of each 3D sample model comprises implementing the semantic correspondence to the plurality of 3D sample models by a non-rigid registration method.

6. The image tampering forensics method according to claim 3, wherein the step of constructing the three-dimensional morphable model comprises:
constructing a plurality of one-dimensional column vectors according to a plurality of three-dimensional coordinates of the plurality of 3D sample models subjected to the semantic correspondence, wherein each one-dimensional column vector corresponds to one of the plurality of 3D sample models, and a plurality of elements of each one-dimensional column vector are the three-dimensional coordinates of a plurality of vertices of each 3D sample model;
splicing a plurality of one-dimensional column vectors of all the plurality of 3D sample models by column to obtain a 3D sample model matrix; and
analyzing the 3D sample model matrix by the principal component analysis method to obtain the three-dimensional morphable model of the object of the category to which the target object belongs.

7. The image tampering forensics method according to claim 1, wherein the step of estimating the three-dimensional normal vector to the supporting plane according to the observation clue comprises:
sampling the plurality of endpoints of the plurality of straight-line segments parallel to the supporting plane in two different directions labeled in the to-be-detected image, and computing a plurality of vanishing points of the two different directions in the to-be-detected image according to a plurality of sampled endpoints;
constructing an equation of a vanishing line of the supporting plane according to a plurality of three-dimensional homogeneous coordinates of the plurality of vanishing points; wherein the vanishing line of the supporting plane is a straight line located on a connecting line of the plurality of vanishing points; and
computing the three-dimensional normal vector to the supporting plane according to the equation of the vanishing line and a plurality of camera intrinsic parameters;
wherein the plurality of endpoints are sampled for multiple times to obtain multiple sets of three-dimensional normal vectors.

8. The image tampering forensics method according to claim 7, wherein the step of sampling the plurality of endpoints of the plurality of straight-line segments comprises:
configuring a two-dimensional coordinate of the center point of each of the two endpoints as an average value, configuring the measurement uncertainty of the center point to be a standard deviation; and sampling the plurality of endpoints of the plurality of straight-line segments by a Gaussian distribution sampling method.

9. The image tampering forensics method according to claim 7, wherein
the step of computing the plurality of vanishing points of each direction in the to-be-detected image comprises computing the plurality of vanishing points of each direction by a maximum likelihood estimation method; and
constructing the equation of the vanishing line of the supporting plane comprises constructing the equation of the vanishing line by a formula for computing a straight-line equation given two points.

10. The image tampering forensics method according to claim 7, wherein a formula for calculating the three-dimensional normal vector is as follows:

$$n = K^T l,$$

wherein, n is the three-dimensional normal vector to the supporting plane in a camera coordinate system; K is a matrix of a plurality of camera intrinsic parameters; T is a notation of matrix transposition; and l is the equation of the vanishing line.

11. The image tampering forensics method according to claim 1, wherein the step of estimating the three-dimensional attitude of the target object according to the observation clue and the three-dimensional morphable model comprises:
constructing a target function for fitting the three-dimensional morphable model according to the at least one characteristic observation point of the target object in the to-be-detected image and the three-dimensional morphable model, and implementing an optimization computation on the target function to obtain a plurality of optimized three-dimensional attitude parameters and a plurality of three dimensional shape parameters of the target object;
wherein multiple times of parameter initialization are implemented on the target function to obtain multiple sets of the plurality of optimized three-dimensional attitude parameters and the plurality of three-dimensional shape parameters.

12. The image tampering forensics method according to claim 11, wherein a formula for computing the target function is as follows:

$$\operatorname*{argmin}_{\theta_p, \theta_s} \sum_{n=1}^{N} \min_m \|c_n - \hat{c}_m(\theta_p, \theta_s; \theta_c)\|^2,$$

wherein N and n refer to a total number and a sequence number of the at least one characteristic observation point of the target object in the to-be-detected image, respectively; $c_n$ is a $n_{th}$ characteristic observation point of the target object; $\hat{c}_m$ is a $m_{th}$ characteristic observation point of a two-dimensional projection of the three-dimensional morphable model; $\|c_n - \hat{c}_m(\theta_p, \theta_s; \theta_c)\|^2$ is a square of an Euclidean distance between the characteristic observation point $c_n$ and the characteristic observation point $\hat{c}_m$; $\theta_p$ and $\theta_s$ refer to a three-dimensional attitude parameter and a three-dimensional shape parameter of the target object; and $\theta_c$ is a camera intrinsic parameter;
a constraint condition of the target function is as follows:

$$|(\theta_s)_n| \le k\sigma_n,$$

where $(\theta_s)_n$ is a $n_{th}$ component of the three-dimensional shape parameter of the target object; $\sigma_n$ is a standard deviation in a direction of a $n_{th}$ principal component when the three-dimensional morphable model is constructed by using a principal component analysis method; and k is a predetermined constant.

13. The image tampering forensics method according to claim 11, wherein the optimization computation of the target function comprises optimizing the target function by an iterative closest point algorithm comprising:
acquiring at least one characteristic observation point of a two-dimensional projection of the three-dimensional morphable model closest to the at least one characteristic observation point of the target object in the to-be-detected image; then correcting a corresponding relationship between the three-dimensional morphable model and the two-dimensional projection thereof according to a corresponding relationship between the at least one characteristic observation point of the target object in the to-be-detected image and a corresponding closest characteristic observation point; and
implementing a parameter optimization to a corrected three-dimensional morphable model, and re-correcting a corresponding relationship between the three-dimensional morphable model subjected to the parameter optimization and a two-dimensional projection thereof until a residual of the target function satisfies a convergence condition or reaches a predetermined number of iterations, wherein a parameter includes a plurality of three-dimensional attitude parameters and a plurality of three-dimensional shape parameters.

14. The image tampering forensics method according to claim 11, wherein the step of implementing multiple times of parameter initialization to the target function comprises:
randomly selecting a plurality of parameters in a parameter dispersion region centered at a predetermined parameter value, and using each of the plurality of parameters as a parameter initial value for each optimization computation of the target function, respectively.

15. The image tampering forensics method according to claim 1 comprises computing the parallelism between the target object and the supporting plane, and/or the parallelism among the plurality of the target objects according to the following formula below:

$$D_{avr}(\mathcal{P}, \mathcal{Q}) = \operatorname{Ang}(p_0, q_0),$$

wherein $\mathcal{P}$ is a distribution set of a plurality of plane normal vectors of the target object; $\mathcal{Q}$ is a distribution set of a plurality of three-dimensional normal vectors to the supporting plane or a distribution set of a plurality of plane normal vectors of another target object; $D_{avr}(\mathcal{P}, \mathcal{Q})$ is an included angle between average directions of the distribution set $\mathcal{P}$ and the distribution set $\mathcal{Q}$; $p_0$ is a weighted average value of the distribution set $\mathcal{P}$; $q_0$ is a weighted average value of the distribution set $\mathcal{Q}$; and Ang is a function for computing the included angle;

a computation formula of a weighted average value $g_0$ of any distribution set $\mathcal{G}$ is as follows:

$$g_0 = \frac{\sum_{a=1}^{A} \frac{1}{e_a^2} g_a}{\sum_{a=1}^{A} \frac{1}{e_a^2}},$$

wherein the distribution set $\mathcal{G}$ is a distribution set of the plurality of plane normal vectors of the target object or a distribution set of the plurality of three-dimensional normal vectors to the supporting plane; $g_a$ is an $a_{th}$ normal vector in the distribution set $\mathcal{G}$; and A is a total number of normal vectors in the distribution set $\mathcal{G}$; and $e_a$ is a residual of the $a_{th}$ normal vector $g_a$: when the distribution set $\mathcal{G}$ is the distribution set of the plurality of plane normal vectors to the target object, a value of the residual $e_a$ is a residual satisfied a convergence condition and obtained by implementing the optimization computation to the target function for constructing the three-dimensional morphable model; when the distribution set $\mathcal{G}$ is the distribution set of the plurality of three-dimensional normal vectors to the supporting plane, a aloe of the residual $e_a$ is a fixed constant.

16. The image tampering forensics method according to claim 1, wherein the method further comprises computing a parallelism threshold and a probability of tampering for judging whether the to-be-detected image is a tampered image according to parallelism probability density distributions of a real target object and a tampered target object in the to-be-detected image;

a computation formula of the probability of tampering is as follows:

$$P(y=1 \mid D) = \frac{f(D \mid y=1)P(y=1)}{f(D \mid y=1)P(y=1) + f(D \mid y=0)P(y=0)},$$

wherein y=1 represents that the to-be-detected image is a tampered image; y=0 represents that the to-be-detected image is a real image; D is the parallelism between the target object and the supporting plane in the to-be-detected image; P(y=1|D) represents a probability that the to-be-detected image is tampered when the parallelism of the target object is D; $f(D|y=1)$ represents a probability density of the parallelism D when the to-be-detected image is a tampered image; $f(D|y=0)$ represents a probability density of the parallelism D when the to-be-detected image is the real image; and priori probabilities are similar when the to-be-detected image is a tampered image and when the to-be-detected image is a real image;

the parallelism threshold is a corresponding parallelism $D_{50\%}$ when the probability of tampering is 50%.

17. An image tampering forensics apparatus comprises:

an observation clue labeling module, configured to label an observation clue of a to-be-detected image, wherein the to-be-detected image includes a target object and a supporting plane, and the target object and the supporting plane have a plane contact relationship;

a three-dimensional morphable model constructing module, configured to construct a three-dimensional morphable model of an object of a category to which the target object belongs;

a supporting plane normal vector estimating module, configured to estimate a three-dimensional normal vector to the supporting plane according to the observation clue;

a target object normal vector estimating module, configured to estimate a three-dimensional attitude of the target object according to the observation clue and the three-dimensional morphable model to obtain a plane normal vector to a plane where a side of the target object in contact with the supporting plane is located; and a judging module configured to compute a parallelism between the target object and the supporting plane, and among a plurality of the target objects according to the three-dimensional normal vector and the plane normal vector, and judging whether the to-be-detected image is a tampered image according to the parallelism, wherein the parallelism is an included angle of normal vectors to different planes;

wherein the step of labeling the observation clue of the to-be-detected image comprises:

labeling at least one characteristic observation point of the target object in the to-be-detected image, and labeling a plurality of endpoints of a plurality of straight-line segments in two different directions in the to-be-detected image, wherein the plurality of straight-line segments are parallel to the supporting plane;

wherein the at least one characteristic observation point includes at least one contour point of the target object; the plurality of straight-line segments of different directions include a plurality of parallel straight-line segments.

* * * * *